United States Patent
Parmar et al.

(10) Patent No.: US 11,273,775 B2
(45) Date of Patent: Mar. 15, 2022

(54) VEHICLE DATA COMMUNICATIONS NETWORK

(71) Applicant: JAGUAR LAND ROVER LIMITED, Warwickshire (GB)

(72) Inventors: Harivaden Parmar, Coventry (GB); George Pappas, Coventry (GB); Michael Ziehensack, Coventry (GB)

(73) Assignee: JAGUAR LAND ROVER LIMITED, Coventry (GB)

( * ) Notice: Subject to any disclaimer, the term of this patent is extended or adjusted under 35 U.S.C. 154(b) by 158 days.

(21) Appl. No.: 16/172,948

(22) Filed: Oct. 29, 2018

(65) Prior Publication Data

US 2019/0126858 A1  May 2, 2019

(30) Foreign Application Priority Data

Oct. 31, 2017 (GB) .................................... 1717956

(51) Int. Cl.
*B60R 16/023* (2006.01)
*H04L 12/40* (2006.01)
(Continued)

(52) U.S. Cl.
CPC ...... *B60R 16/023* (2013.01); *H04L 12/40013* (2013.01); *H04L 12/40189* (2013.01);
(Continued)

(58) Field of Classification Search
None
See application file for complete search history.

(56) References Cited

U.S. PATENT DOCUMENTS

| | | | |
|---|---|---|---|
| 2015/0207858 A1* | 7/2015 | de Bes | H04L 67/10 709/218 |
| 2016/0142303 A1 | 5/2016 | Kim et al. | |

(Continued)

FOREIGN PATENT DOCUMENTS

| | | |
|---|---|---|
| DE | 102015216284 | 3/2017 |
| DE | 102017208532 | 12/2017 |
| DE | 102017216987 | 3/2018 |

OTHER PUBLICATIONS

AUTOSAR: SOME/IP Service Discovery Protocol Specification, Release 1.2.0, Oct. 27, 2017, pp. 1-74—Company typeface.

(Continued)

*Primary Examiner* — Abdhesh K Jha
(74) *Attorney, Agent, or Firm* — Carlson, Gaskey & Olds, P.C.

(57) ABSTRACT

The present disclosure relates to an improved vehicle data communications network comprising controllers configured in accordance with a Service-Oriented Architecture, arranged to offer available services as subscription service on the vehicle data communications network. In particular, a controller for an automotive data communications network in a vehicle is disclosed. The controller may be operatively connected in use to a data bus and to a high-speed data communications channel. The data bus may comprise at least one first electronic device connected to it. The controller may comprise a first input, a processor, a second input and an output. The first input may be configured in use to receive a first data message from the data bus, the first data message comprising data associated with at least one first electronic device. The processor may be configured in use to identify at least one service associated with the received first data message. The output may be configured in use to output a second data message on the high-speed data communications channel, the second data message offering the at least (Continued)

one service as a subscription service. The second input may be configured in use to receive a subscription request for the service from a remotely located second electronic device operatively coupled to the automotive data network. Wherein the output is configured in use to output a third data message comprising data associated with the subscribed service to the remotely located second electronic device via the high-speed data communications channel.

20 Claims, 6 Drawing Sheets

(51) Int. Cl.
*H04L 29/06* (2006.01)
*G07C 5/00* (2006.01)
*H04L 65/1033* (2022.01)

(52) U.S. Cl.
CPC ............ *H04L 65/104* (2013.01); *G07C 5/008* (2013.01); *H04L 2012/40215* (2013.01); *H04L 2012/40234* (2013.01); *H04L 2012/40241* (2013.01); *H04L 2012/40273* (2013.01)

(56) References Cited

U.S. PATENT DOCUMENTS

2017/0063971 A1 3/2017 Poehnl et al.
2017/0251339 A1* 8/2017 Addepalli ......... H04W 52/0206

OTHER PUBLICATIONS

Search Report for DE Application No. 102018217690.6, dated Oct. 16, 2019.
Combined Search and Examination Report under Sections 17 and 18(3) for Application No. GB 1717956.5 dated Mar. 21, 2018.

* cited by examiner

VEHICLE DATA COMMUNICATIONS NETWORK

CROSS REFERENCE TO RELATED APPLICATIONS

This application claims priority to United Kingdom Patent Application No. GB 1717956.5 filed on 31 Oct. 2017.

TECHNICAL FIELD

The present disclosure relates to an improved vehicle data communications network and particularly, but not exclusively, to a vehicle data communications network in which available functionality is made available as subscription services. Aspects of the invention relate to a controller for an automotive data communications network in a vehicle arranged to output data associated with a subscription request, to a controller arranged to generate a subscription request for a service, to a method of making hardware and/or software functionality available as a subscription service on a vehicle data communications network, to a vehicle comprising a controller, to a computer program product and to a computer-readable data carrier.

BACKGROUND

Modern automotive vehicles comprise various different electronic sensors and actuators, configured to provide a myriad of different functionality. For example, it is now common to find weather sensors embedded in vehicles, arranged to measure ambient weather conditions such as temperature, and to detect rain. Physical information measured by such sensors is often used to automate certain vehicle functions. For example, automating activation of windscreen wipers when rain is detected, or automating activation of vehicle headlamps when ambient lighting conditions are poor. Similarly automatic traction control systems exist in which sensor data is used to automatically improve the handling of a vehicle. These are but a few illustrative examples in which vehicle sensor data is used to provide improved vehicle functionality. To cater for such functionality existing vehicles are provided with complex data networks comprising a plurality of different sensors, actuators and electronic control units. Typically, a vehicle comprises a plurality of different electrical networks, which are operatively connected to enable data to be exchanged between the different networks. The different electrical networks are often divided according to vehicle system. Thus, for example, a conventional vehicle may comprise at least the following different electrical networks: powertrain electronics, chassis and body electronics, and human machine interface (HMI) and infotainment system electronics.

Existing automotive networks typically comprise a combination of the following three different network technologies, Controller Area Network (CAN) bus, Local Interconnect Network (LIN) bus, and FlexRay. CAN bus is a vehicle bus standard designed to allow microcontrollers and devices to communicate with each other without a host computer. LIN is a serial network protocol used for communication between components within a vehicle. FlexRay is an automotive network communications protocol arranged to support higher data rates than CAN or LIN. For example, FlexRay can support data rates up to 10 Mbit/s.

Figure 1:
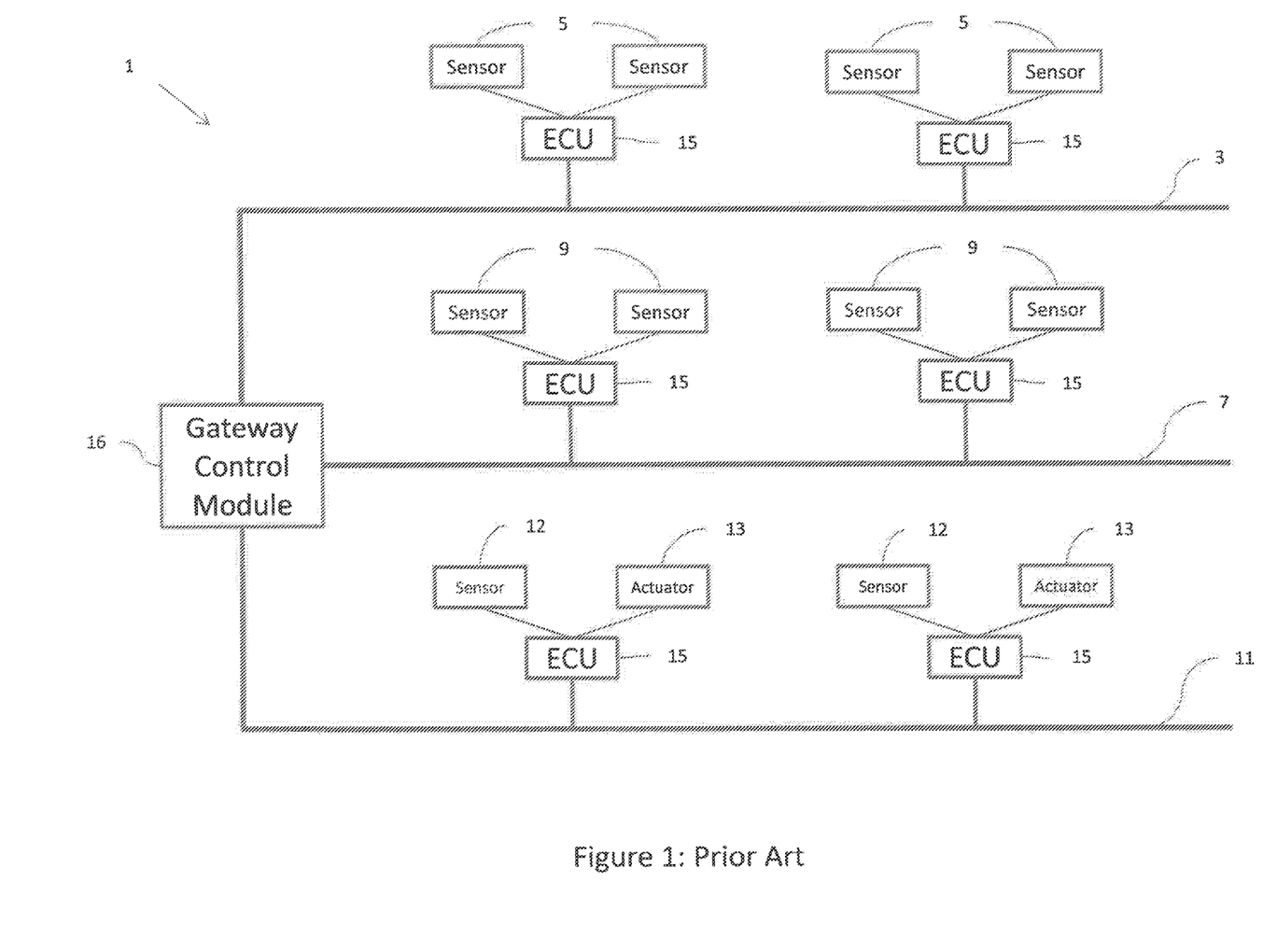
FIG. 1, which has already been described in the background section, is a schematic illustration of an example vehicle data communications network known in the state of the art.

FIG. 1 is a schematic illustration of an example automotive vehicle data network 1 comprised within an automotive vehicle. Each vehicle system may be provided with its own electrical network. For example, the vehicle's powertrain may be provided with a first CAN bus 3 arranged to receive data from one or more sensors 5 located within the vehicle's powertrain system. The sensors 5 may relate to, for example, sensors configured to monitor brake calliper temperatures, engine temperature, or engine oil levels. Similarly, the vehicle's infotainment system may also be provided with an electrical network, albeit in this instance the infotainment system may be provided with a LIN bus 7. One or more sensors 9 arranged to measure a plurality of different vehicle cabin parameters may be provided, and configured to exchange data messages using the LIN bus 7. Similarly, the vehicle chassis and body electronics system may also be provided with an electrical network comprising a second CAN bus 11, the chassis system comprising one or more sensors 12 and actuators 13 configured to transmit data over the second CAN bus 11. Each sensor 5, 9, 12 and actuator 13 may be operatively coupled to an electronic control unit (ECU) 15. The ECUs 15 may be configured to receive captured sensor and/or actuator data and to generate a portable data message for transmission over the relevant operatively coupled bus 3, 7, 11. Similarly, the ECUs 15 may be configured to receive data messages transmitted over the relevant operatively coupled bus 3, 7, 11, and to forward the received messages to a relevant sensor 5, 9, 12 or actuator 13.

A Gateway Module 16 may be provided, which operatively connects the electrical networks associated with the different vehicle systems together. In particular, the Gateway Module 16 enables data captured by a sensor 5 located on a first electrical network to be transmitted and shared with an actuator 13 located on a second electrical network, and also enables the exchange of data between different ECUs 15. For example, sensor data captured by one or more sensors 5 operatively coupled to the first CAN bus 3 within the vehicle's powertrain electrical network, may be routed to one or more actuators 13 operatively coupled to the second CAN bus 11 within the vehicle's chassis and body electrical network. Operation of the one or more actuators 13 may then be made dependent on the received sensor data captured by the one or more sensors 5 within the vehicle's powertrain electrical network. The Gateway Module 16 effectively enables data to be transmitted and shared between different vehicle networks. Typical data throughput speeds of existing Gateway Modules 16 are in the order of several tens of Mbit/s. However, in order to route the captured sensor data to the appropriate actuator via the relevant ECU, requires programming the relevant ECUs transmitting data with the static data routes defining where specific data messages are to be sent within the vehicle's electrical network. Typically, this level of configuration is carried out at the design phase of the vehicle. In a typical vehicle, this may comprise configuring hundreds or thousands of sensors and actuators within the vehicle, each requiring different static data routes. As the number of sensors, actuators and ECUs within a vehicle increase, the complexity and time required to configure the electronic data network within the vehicle to provide the required functionality increases considerably. This has a knock-on effect on vehicle design time.

A further shortcoming of conventional automotive data networks, such as the network illustrated in FIG. 1, is that it is extremely difficult and laborious to retrofit the vehicle with additional functionality not configured during initial vehicle assembly. Retrofitting a vehicle with additional electronic hardware and functionality often requires a significant reconfiguration of existing ECUs, to define new static data paths for the newly available data and hardware, and to program existing ECUs how to handle the newly available data. In practice this is usually done as an after-sales service by the manufacturer of the vehicle, and comprises retrofitting the vehicle with additional hardware and software functionality. This retro fitting process is extremely time consuming and as a result it is often prohibitively expensive.

As the proliferation of mobile smartphones has increased, consumer demand to integrate smartphone functionality with vehicle electronic systems has also increased. Consumers now expect modern vehicles to provide some level of mobile smartphone integration. For example, routing received telephone calls over a vehicle's on-board audio system is a standard feature now provided in most vehicles. Similarly, integration of a smartphone's native music player with a vehicle's on-board music player is also a feature commonly found on modern vehicles. However, a limitation of current vehicular data networks is that the level of mobile smartphone integration must be configured and defined during an initial vehicle configuration, due to the relative complexity associated with programming the relevant vehicle ECUs to interface with a mobile smartphone. Any functional integration of a smartphone with existing electronic vehicle systems that has not been initially conceived during assembly is often unavailable. Unfortunately this means that despite the continuously evolving functionality available to mobile smartphones, provided for by the development of new mobile applications (commonly referred to as 'apps'), there currently is no means for extending such additional functionality, and in particular functionality associated with newly developed mobile apps, to vehicles via improved mobile smartphone integration.

At least in certain embodiments, the present invention has been devised to mitigate or overcome at least some of the above-mentioned problems and limitations associated with the state of the art, and in particular to improve the ease with which the functionality provided by existing vehicle data networks may be extended post-sale.

SUMMARY OF THE INVENTION

According to an aspect of the present invention there is provided a controller for an automotive data communications network in a vehicle. The controller may be operatively connected in use to a data bus and to a high-speed data communications channel. The data bus may comprise at least one first electronic device connected to it. The controller may comprise a first input, a processor, a second input and an output. The first input may be configured in use to receive a first data message from the data bus, the first data message comprising data associated with at least one first electronic device. The processor may be configured in use to identify at least one service associated with the received first data message. The output may be configured in use to output a second data message on the high-speed data communications channel, the second data message offering the at least one service as a subscription service. The second input may be configured in use to receive a subscription request for the service from a remotely located second electronic device operatively coupled to the automotive data network. Wherein the output is configured in use to output a third data message comprising data associated with the subscribed service to the remotely located second electronic device via the high-speed data communications channel.

By providing an automotive data communications network with the aforementioned controller means that functionality available on the network as a result of operatively connected devices may be configured in accordance with a Service-Oriented Architecture (SOA). Thus, hardware functionality and software functionality available to a controller comprised in the automotive data communications network may be made available as subscription services to other devices within the network. In particular, functionality associated with a first electronic device operatively connected to a data bus, which is itself operatively connected to the controller, may be offered by the controller as a subscription service to other devices within or connected to the vehicle data communications network. This also significantly improves the ease with which new hardware and software componentry may be incorporated into the vehicle data communications network. In particular, newly available hardware or software, for example arising from an aftersales upgrade, may be offered as a new subscription service within the network. As a result of the available hardware and software functionality being offered as subscription services, it is no longer required to define static data routes between the different hardware components comprised within the vehicle data communications network. Instead, the present controller enables dynamic data routes to be established, in dependence on received subscription requests. The vehicle data communications network comprising the present controller is more flexible and can more readily enable mobile device integration. For example, mobile telephone integration is improved. The vehicle data communications network comprising the controller according to the present aspect of the invention provides the basis for expanded future mobile telephone functionality. A mobile device, such as a mobile telephone may avail itself of data available on the vehicle data communications network, simply by generating a subscription request for the required service. New mobile apps may generate subscription requests for different available data as and when required to offer a user new functionality, even where such new functionality was not envisaged during initial network design and configuration. This is fundamentally different to the state of the art, where the extent of mobile device integration needs to be pre-defined during network design and configuration. The present controller thus provides the foundations for the improved data connectively required of the vehicles of the future.

The processor may be configured in use to identify at least one service ID from a lookup table comprised in a memory, the at least one service ID being associated with the received first data message and uniquely identifying the at least one service associated with the received first data message. The output may be configured in use to output the second data message comprising the at least one service ID. The second input may be configured in use to receive the subscription request designating the at least one service ID from the remotely located second electronic device. Wherein the output may be arranged in use to output the third data message associated with the designated service ID to the remotely located second electronic device via the high-speed data communications channel. Optionally, the controller may comprise the memory. The use of lookup tables and service IDs provide a convenient means enabling the controller to identify the desired services. Within a SOA network functionality is represented by services which may be uniquely identified via service ID.

In certain embodiments, the received subscription request comprises a network address associated with the remotely located second electronic device, and the output may be configured in use to output the third data message to the remotely located second electronic device in dependence on the network address. This enables the controller to identify the intended recipient of the third data message and to output the third data message directly to the intended recipient.

In accordance with certain embodiments, the data bus may comprise any one of:
- a CAN (Controller Area Network) bus;
- a LIN (Local Interconnect Network) bus; or
- a FlexRay bus.

Accordingly, the present controller is suitable for integration and use with existing vehicle data bus technologies. Thus, the present controller may be integrated into current vehicle data communications networks, with minimal required reconfiguration. This is advantageous for the immediate and short term, where existing manufacturers may be hesitant to immediately replace tried and tested known existing network technologies with new untested network technologies. By enabling the controller of the present invention to be integrated with current vehicle network technologies facilitates the early adoption of this new technology within the automotive industry.

In accordance with certain embodiments, the high-speed data communications channel may comprise an Ethernet communications channel. The advantage of using an Ethernet communications channel is that it is an existing technology that has a significantly higher data throughput than current solutions used in the automotive industry, and helps to reduce data bottle necks forming within the automotive data communications network within a vehicle.

In certain embodiments the high-speed data communications channel may have a data transfer rate greater than or equal to 100 Mbit/s. In other embodiments the high-speed data communications channel may have a data transfer rate greater than or equal to 100 Gbit/s. This is significantly greater than the existing solutions in the state of the art.

In accordance with certain embodiments, the first electronic device may comprise a sensor configured to capture data associated with a physical variable. The first input may be configured in use to receive a first data message comprising data associated with the physical variable captured by the at least one first electronic device. The processor may be configured in use to identify at least one service associated with the captured data. The output may be configured in use to output the second data message on the high-speed data communications channel, the second data message offering the at least one service as a subscription service. The second input may be configured in use to receive the subscription request for the service from the remotely located second electronic device; and the output may be configured in use to output the third data message comprising the captured data associated with the physical variable to the remotely located second electronic device. In this way it is possible for the controller to offer the data captured by a sensor operatively connected to the controller via a shared data bus, to other devices within the automotive data communications network.

In accordance with certain embodiments the second electronic device may comprise an actuator. The output may be configured in use to output the third data message to the actuator.

In certain embodiments the second electronic device may be a second controller operatively connected to a second data bus and the high-speed data communications channel. The output may be configured in use to output the third data message to the second controller. In this way the controller is able to transmit data to other controllers within the vehicle data communications network.

Optionally, the second electronic device may be a portable processing device, and the output may be configured in use to output the third data message to the portable processing device. For example, the portable processing device may be a mobile telephone, or other portable electronic device, such as a laptop, or tablet. Thus, advantageously the controller provides an improved means for sharing data with such devices.

In accordance with another aspect of the invention there is provided a controller for an automotive data network in a vehicle, the controller being operatively connected in use to a data bus and a high-speed data communications channel, the data bus comprising at least one first electronic device connected to it, and wherein the controller comprises: a first input configured in use to: receive a first data message via the high-speed data communications channel from a remotely located second electronic device, the first data message offering a service as a subscription service; an output configured in use to: output a second data message comprising a subscription request for the service to the remotely located second electronic device; a second input configured in use to: receive a third data message from the remotely located second electronic device comprising data associated with the subscribed service. This aspect of the invention relates effectively to a controller arranged to subscribe to services available on the vehicle data communications network, and benefits from many of the advantages associated with the previously described aspect. In use, it is envisaged that a vehicle data communications network may comprise two or more controllers, in which both controllers simultaneously make services for subscription available over the vehicle data communications network, and subscribe to available services.

The processor may be configured in use to determine if the service associated with the first data message is of interest, in dependence on a service ID associated with the first data message. The output may be configured in use to output the second data message comprising the subscription request, the subscription request comprising a service ID associated with the desired subscription service.

The controller may comprise a memory, and wherein the processor may be configured in use to identify the service associated with the service ID from a lookup table comprised in the memory.

The output may be configured in use to output the second data message comprising the subscription request, the subscription request comprising a service ID uniquely identifying the requested service, to the remotely located second electronic device. This enables the controller to better define the desired service being subscribed to.

The received first data message may comprise a network address associated with the remotely located second electronic device, and the output may be configured in use to: output the second data message to the remotely located second electronic device in dependence on the network address.

The output may be configured in use to output a control signal enabling operation of the at least one first electronic device via the data bus, in dependence on the received third data message.

In accordance with certain embodiments the at least one first electronic device may be any one of: an actuator, a sensor or an electronic control unit.

In accordance with yet a further aspect of the invention there is provided a method of providing data associated with a first electronic device operatively connected to a data bus as a subscription service in an automotive data communications network. The network may comprise a controller operatively coupled in use to the data bus and to a high-speed data communications channel. The method may comprise receiving a first data message, the first data message comprising data generated by the first electronic device; identifying at least one service associated with the received first data message; outputting a second data message on the high-speed data communications channel, the second data message offering the at least one service as a subscription service; receiving a subscription request for the service from a remotely located second electronic device operatively coupled to the automotive data communications network; and outputting a third data message associated with the subscribed service to the second electronic device. This aspect of the invention provides the method enabling the controllers of the previous aspects of the invention to offer functionality associated with the vehicle data communications network as subscription services over the vehicle data communications network. The present aspect and its optional features benefit from the same advantages as previously recited in respect of the preceding aspects and features of the invention.

The method may comprise: identifying at least one service ID from a lookup table, the at least one service ID being associated with the received first data message and uniquely identifying the at least one service associated with the received first data message; including the at least one service ID in the output second data message; receiving the subscription request designating the at least one service ID from the remotely located second electronic device; and outputting the third data message comprising data associated with the designated service ID to the remotely located second electronic device.

The received subscription request may comprise a network address associated with the remotely located second electronic device, and the method may comprise: outputting the third data message to the remotely located second electronic device in dependence on the network address.

In accordance with certain embodiments the first electronic device may relate to a sensor configured to capture data associated with a physical variable, and the method may comprise: receiving a first data message comprising data associated with the physical variable captured by the first electronic device; identifying at least one service associated with the captured data; outputting the second data message on the high-speed data communications channel, the second data message offering the at least one service as a subscription service; receiving the subscription request for the service from the remotely located second electronic device; and outputting the third data message comprising the captured data associated with the physical variable to the remotely located second electronic device.

In certain embodiments the second electronic device may be relate to an actuator, and the method may comprise: outputting the third data message to the actuator.

In certain embodiments the second electronic device may relate to a second controller operatively connected to the high-speed data communications channel, and the method may comprise: outputting the third data message to the second controller.

In yet further embodiments the second electronic device may relate to a portable processing device, and the method may comprise: outputting the third data message to the portable processing device. Optionally, the portable processing device may relate to a mobile telephone, and the method may comprise outputting the third data message to the mobile telephone.

In accordance with yet a further aspect of the invention there is provided a vehicle comprising the controller of the previous aspects of the invention.

In accordance with yet a further aspect of the invention there is provided a computer program product comprising instructions, which when executed on a processor, configure the processor to carry out the method of the preceding aspect of the invention.

In particular, the processor may be configured to receive a first data message, the first data message comprising data generated by the first electronic device; identify at least one service associated with the received first data message; outputting a second data message on a high-speed data communications channel, the second data message offering the at least one service as a subscription service; receiving a subscription request for the service from a remotely located second electronic device operatively coupled to an automotive data communications network; and outputting a third data message associated with the subscribed service to the second electronic device.

In accordance with yet a further aspect of the invention there is provided a computer-readable data carrier having stored thereon instructions for carrying out the method of any of the previous aspects of the invention.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

One or more embodiments of the invention will now be described, by way of example only, with reference to the accompanying drawings, in which.

DETAILED DESCRIPTION

Figure 2:
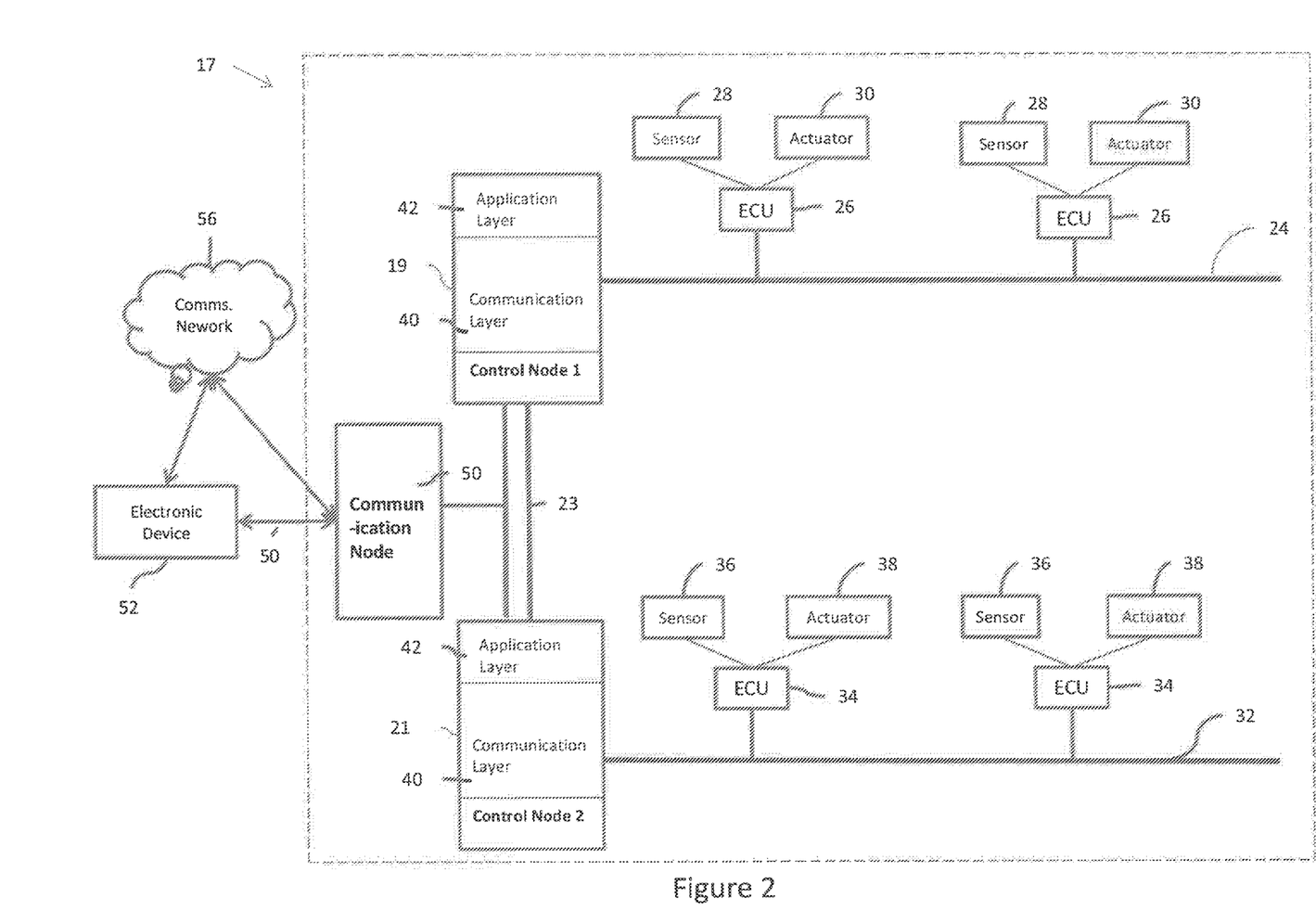
FIG. 2 is a schematic illustration of a vehicle data communications network comprising controllers arranged to broadcast services available within the vehicle data communications network.
Figure 6:
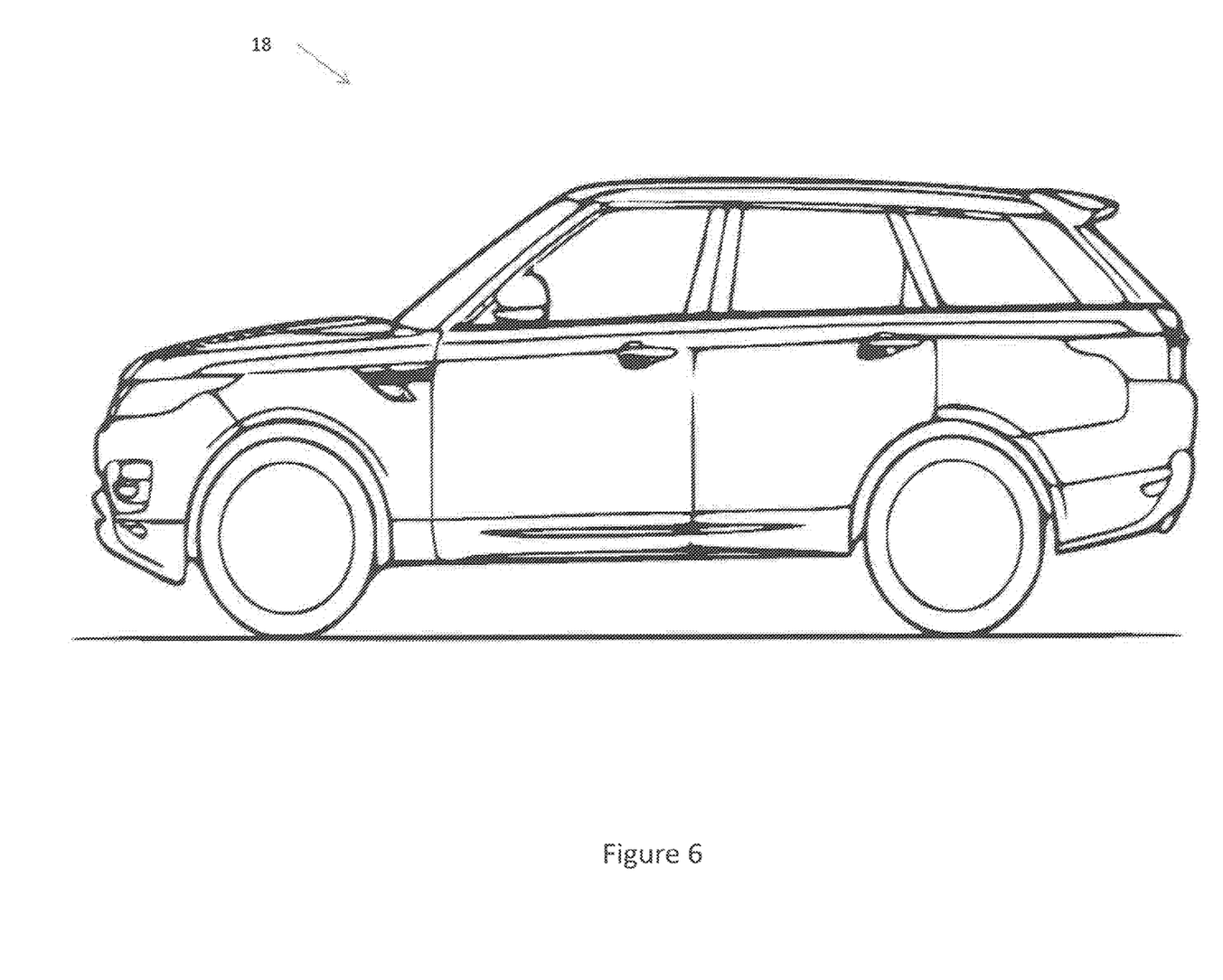
FIG. 6 is an illustrative vehicle comprising the data communication network of FIG. 2 including the control nodes of FIG. 3.

FIG. 2 is a schematic illustration of an automotive data communications network 17 in accordance with an embodiment of the invention, which is located within a vehicle 18 (see FIG. 6). For the purposes of the present disclosure the terms automotive data communications network and vehicular data communications network may be used interchangeably. For illustrative purposes only, the automotive data communications network 17 illustrated in FIG. 2 is shown as comprising a first control node 19 and a second control node 21. The control nodes are operatively coupled via a high-speed data communications channel 23, which in certain embodiments may relate to an Ethernet communications channel. In certain embodiments, the data throughput of the high-speed communications channel 23 may be several Mbit/s or even several Gbit/s. In certain embodiments the data throughput may be greater than or equal to 100 Mbit/s, in other embodiments greater than or equal to 100 Gbit/s. It is to be appreciated that in a real-world application the data communications network 17 is likely to comprise a plurality of different control nodes operatively coupled via the high-speed communications channel 23.

The first control node 19 may be operatively coupled to a first data bus 24. The first data bus 24 may comprise one or more first ECUs 26, each operatively coupled to one or more first sensors 28 and/or first actuators 30. Data generated by the one or more first sensors 28 and/or first actuators 30 and the first ECUs 26 may be transmitted via the first data bus 24. Within the present context it is to be appreciated that the term data bus is used to refer to any data communication channel operating in accordance with a bus protocol. In certain embodiments, the data bus may relate to a point-to-point communication channel between an electronic device, such as a sensor and the first control node 19. Similarly, the data bus may also refer to a shared communication channel used by two or more electronic devices to transfer data.

Similarly, the second control node 21 may be operatively coupled to a second data bus 32. The second data bus 32 may comprise one or more second ECUs 34, each operatively coupled to one or more second sensors 36 and/or second actuators 38. Again, data generated by the one or more second sensors 36 and/or second actuators 38 and the second ECUs 34 may be transmitted via the second data bus 32.

Figure 3:
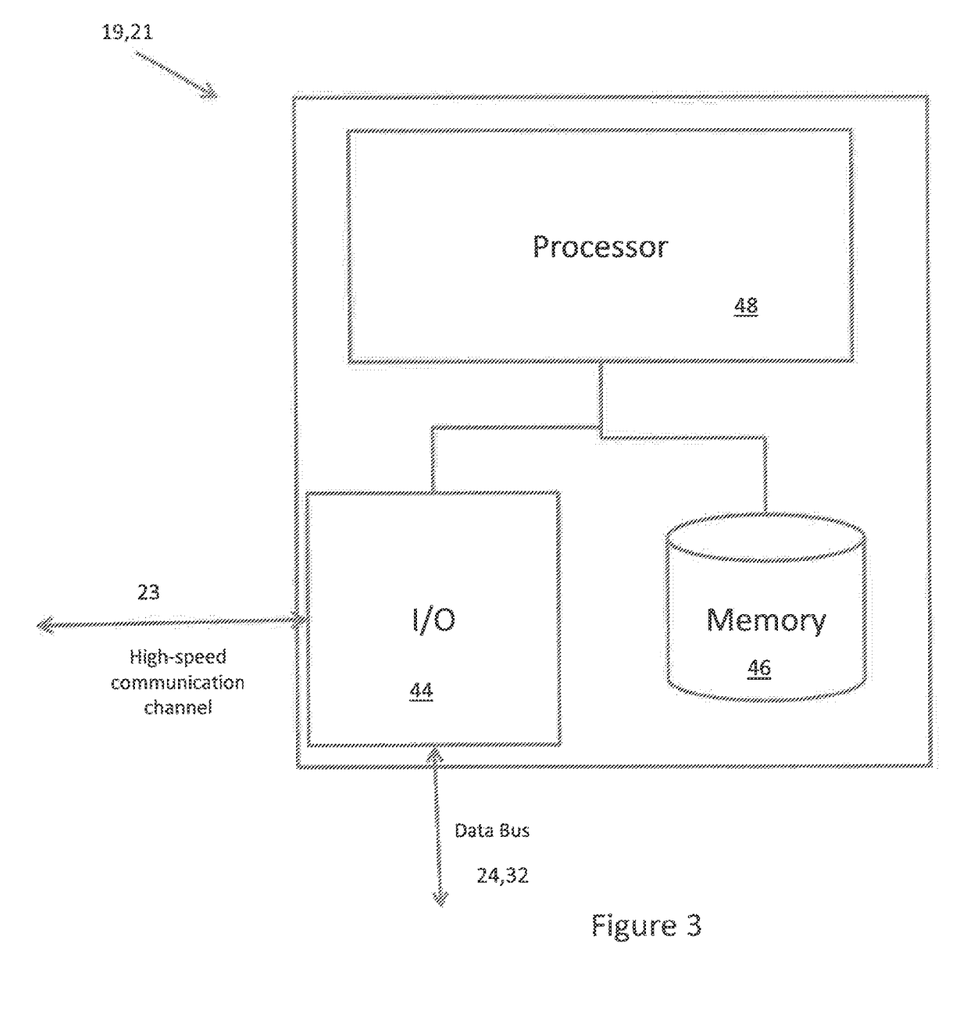
FIG. 3 is a schematic diagram illustrating the functional modules comprised in the control nodes illustrated in FIG. 2.

The first and second control nodes 19, 21 may each comprise a communication layer 40 and an application layer 42. The communication layer 40 may comprise an input/output (I/O) module 44. The I/O module 44 is arranged to receive and output data messages via the high-speed communications channel 23 and via the relevant operatively coupled data bus—i.e. the first control node 19 via the first data bus 24, and the second control node 21 via the second data bus 32. FIG. 3 illustrated the functional components comprised within respectively the first control node 19 and the second control node 21. In addition to comprising an I/O module 44, both the first and second control nodes 19, 21 comprise a memory 46 and a processor 48. For present purposes it is not essential that the memory 46 be local to the control nodes 19, 21. The communication layer 40 and the application layer 42 may both be configured in software installed in the memory 46, and arranged to be executed by the processor 48 local to the first and second control nodes 19, 21. The communication layer 40 may be configured to determine destination information associated with data messages received via the I/O module 44, irrespective of whether they are received via the relevant operatively coupled data bus 24, 32, or via the high-speed communications channel 23. The application layer 42 may be configured to process the received data messages in order to provide further functionality. This will be described in further detail in the ensuing description.

In certain embodiments, the data communications network may also comprise a communications node 50 operatively coupled to the high-speed communications channel 23. The communications node 50 may be configured to provide a communications interface with an electronic device 52 located external to the data communications network 17. For example, in certain embodiments the electronic device 52 may comprise a portable processing terminal such as a portable computer, or to a mobile smartphone. In certain embodiments the communication interface may comprise a direct point-to-point communications channel 54, which in certain embodiments may relate to a wireless communications channel. In other embodiments, where the electronic device 52 is located remotely from the vehicle 18 comprising the data communications network 17, the communications interface may comprise a communications channel established over a publically available wide-access network such as the Internet 56. This enables an electronic device 52 located remotely from the vehicle 18 in which the data communications network 17 is located to communicate with the data communications network 17.

In use, the first and second control nodes 19, 21 may be arranged to receive one or more data messages from their respective operatively coupled data bus 24, 32, the one or more data messages originating from any one of a sensor 28, 36, an actuator 30, 38 or an ECU 26, 34 operatively coupled to the relevant data bus 23, 32. One or more services associated with the received one or more data messages are identified, and the identified one or more services transmitted over the high-speed communications channel 23. For example, where the first control node 19 is transmitting the one or more identified services associated with data received from the devices connected to the first data bus 24 over the high-speed communications channel 23, the second control node 21 in receipt of the transmitted one or more services may determine if the received services are required. If required, the second control node 21 may subscribe to the services broadcast by the first control node 19 over the high-speed communications channel 23. In this way, the second control node 21 is able to benefit from data generated by sensors 28, actuators 30 and ECUs 26 operatively coupled to the first control node 19. In other words, the first control node 19 is configured to offer the functionality associated with the devices operatively connected to the first data bus 24 as subscription services to other devices located on the automotive network 17. In this way the various different functionality provided by the different electronic devices operatively coupled to the different vehicle data bus may be offered as Service-Oriented Architecture (SOA), and the first control node 19 is able to act as a proxy server for the electronic devices (i.e. the sensors 28, actuators 30, and ECUs 26) operatively coupled to it via the first data bus 24. Further details are set out in relation to FIG. 4 below. In certain embodiments the sensors 28 may relate to high speed sensors, such as high bandwidth image captured devices (e.g. cameras).

The method implemented by the first control node 19 in offering hardware functionality as a SOA subscription services on the vehicle data communications network 17 is now described with reference to FIG. 4, which is a data flow chart outlining the exchange of data messages occurring between the first control node 19 and the second control node 21, when the first control node 19 is offering one or more services for subscription. It is to be appreciated that for illustrative purposes the method is being described with respect to the data network 17 of FIG. 2, comprising two control nodes 19, 21, but that in a real-world application of the present embodiment, it is envisaged that the method would be implemented on a vehicle data communications network comprising a greater number of control nodes. Irrespective of the total number of control nodes comprised in the vehicle data communications network, the method of offering functionality as a SOA subscription service remains unchanged.

The method is initiated by the transmission of a data message from a first bus node, at step 101. Within the present context the first bus node is intended to represent any electrical device operatively coupled to the first data bus 24, such as any one of the sensors 28, actuators 30 or ECUs 26. The first bus node data message may comprise a bus node ID, which uniquely identifies the source of the bus node data message to the first control node 19. For example, the bus node ID may uniquely identify which sensor 28, actuator 30, or ECU 26 generated the first bus node data message 101. Once the first bus node data message has been received, the first control node 19 may access a lookup table in order to identify the service IDs associated with the received first bus node data message, and maps any associated service IDs to the received bus node ID, at step 103. In certain embodiments the lookup table may be stored in the memory 46 accessible to the first control node 19, and the step of mapping the bus node ID to an associated service ID may be carried out either in the first control node's communication layer 40 or application layer 42. At step 105, the first control node 19 forwards a data message comprising one or more identified service IDs on the high-speed communication channel 23. This step is also interchangeably referred to as 'broadcasting' the service on the high-speed communication channel 23. At step 107, the broadcast data message is processed by the second control node 21, in order to determine if the associated service is required by the second control node 21, or any one of the bus nodes (i.e. any one of the sensors 36, actuators 38, or ECUs 34) operatively coupled to the second data bus 32. If the second control node 21 determines that the broadcast service is not required then the received data message is simply discarded, otherwise a subscription request message is generated and transmitted via the high-speed communication channel 23 to the first control node 19, at step 109. The subscription request message may comprise the network address of the second control node 21. Upon receipt of the subscription request message, at step 111, the first control node 19 may generate a subscription event that associates the subscribed service ID to the network address of the second control node 21. A subsequent data message received, at step 113, from a bus node located on the first data bus 24, is processed by the first control node 19 in order to map the relevant service ID to the bus node ID, at step 115. Should it be determined that the identified service ID is associated with a subscription event, as generated at step 111, then the data message received at step 113 may be forwarded to the subscribing second control node 21, at step 117.

In certain embodiments a subscription event may be time limited, and expires once a time threshold has lapsed. The time threshold may relate to any chosen time period. For example, the time threshold may relate to a time period of five minutes, or a few hours. This means that for the duration of time threshold after the subscription event has been generated, all data associated with the subscribed service is forwarded to the subscribing control node. Upon expiry of the time threshold, the subscription event expires and the second control node 21 needs to re-subscribe to the service in order to receive the desired data.

In certain embodiments the subsequent data messages received at step 113 from the first bus node may be directly forwarded by the first control node 19 to the subscribing second control node 21.

In other embodiments the first control node 19 may be configured to process data messages received from the bus node. For example, at step 103, the first control node 19 may be configured to process the data message received from the first bus node and to generate one or more second messages associated with one or more different service IDs, which are subsequently transmitted via the high-speed communication channel 23 to the second control node 21. This may be carried out in the first control node's application layer. This is advantageous where data received from a bus node may be associated with a plurality of different services. In such embodiments it is also envisaged that at step 115 the first control node 19 processes the received bus data to generate further data messages each associated with a different service ID, and individually broadcast on the high-speed communication channel 23. For example, this might occur where the received bus node data message comprises captured sensor data associated with different measured physical variables. Once the relevant service IDs have been identified at step 115, the first control node 19 generates and transmits a data message comprising the data associated with the subscribed service to the subscribing second control node 21, at step 117. This is particularly advantageous for applications in which the bus node data requires pre-processing. This is also advantageous in applications where the subscribing control node only requires a portion of the generated bus data, and by ensuring that the first control node pre-processes the bus data prior to transmission over the high-speed communications channel, ensures that the available bandwidth is used more efficiently, since only requested information is transmitted.

Figure 4:
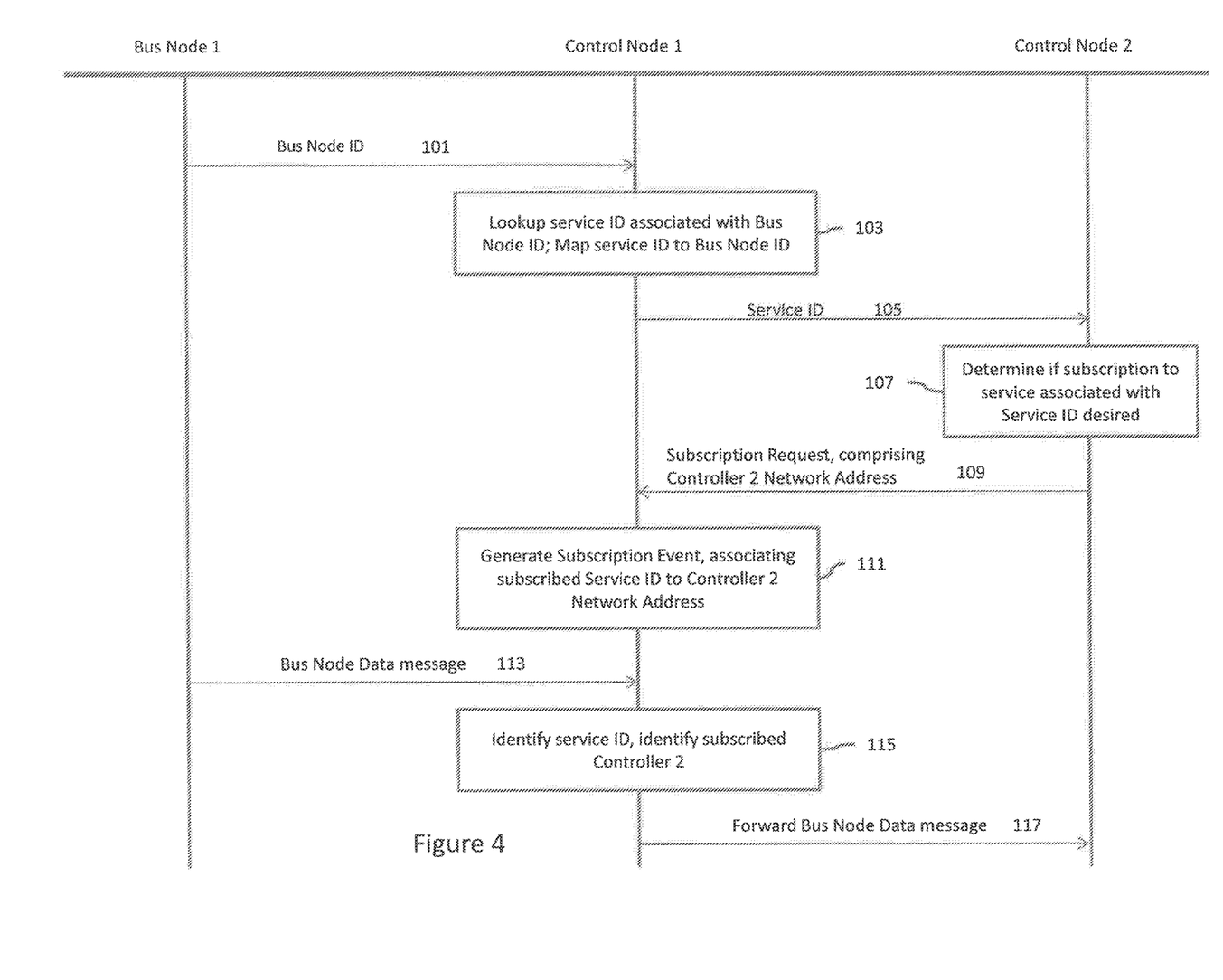
FIG. 4 is a data flow chart illustrating a method adopted by the controllers of FIG. 2 for broadcasting available hardware and software functionality, as a subscription service over a shared communications channel, and how to subscribe to such available services.

In embodiments comprising a communications node 50 in communication with a remotely located portable device 52, such as a smartphone, data generated by any bus node within the vehicle data communications network 17 may be provided to the portable device 52 in the same way as it was provided to the second control node 21 pursuant to the method of FIG. 4. In such embodiments, the communications node 50 provides the function of the second control node 21, and in particular generates a subscription request for a specific service broadcast by the first control node 19. The subscribed service data is subsequently forwarded to the portable device 52. In effect in such embodiments the first control node 19 and the communications node 50 function as conduits. In this way it is possible to share data captured by existing electronic vehicular systems and share them with any electronic device, such as a smartphone, significantly improving the ease of integration. This feature is particularly advantageous since it provides, for example, mobile app developers with access to data generated within the automotive vehicle data communications network 17, which may form the basis for new mobile app development providing increased functionality to vehicle operators, and improving vehicle-smartphone integration.

Figure 5:
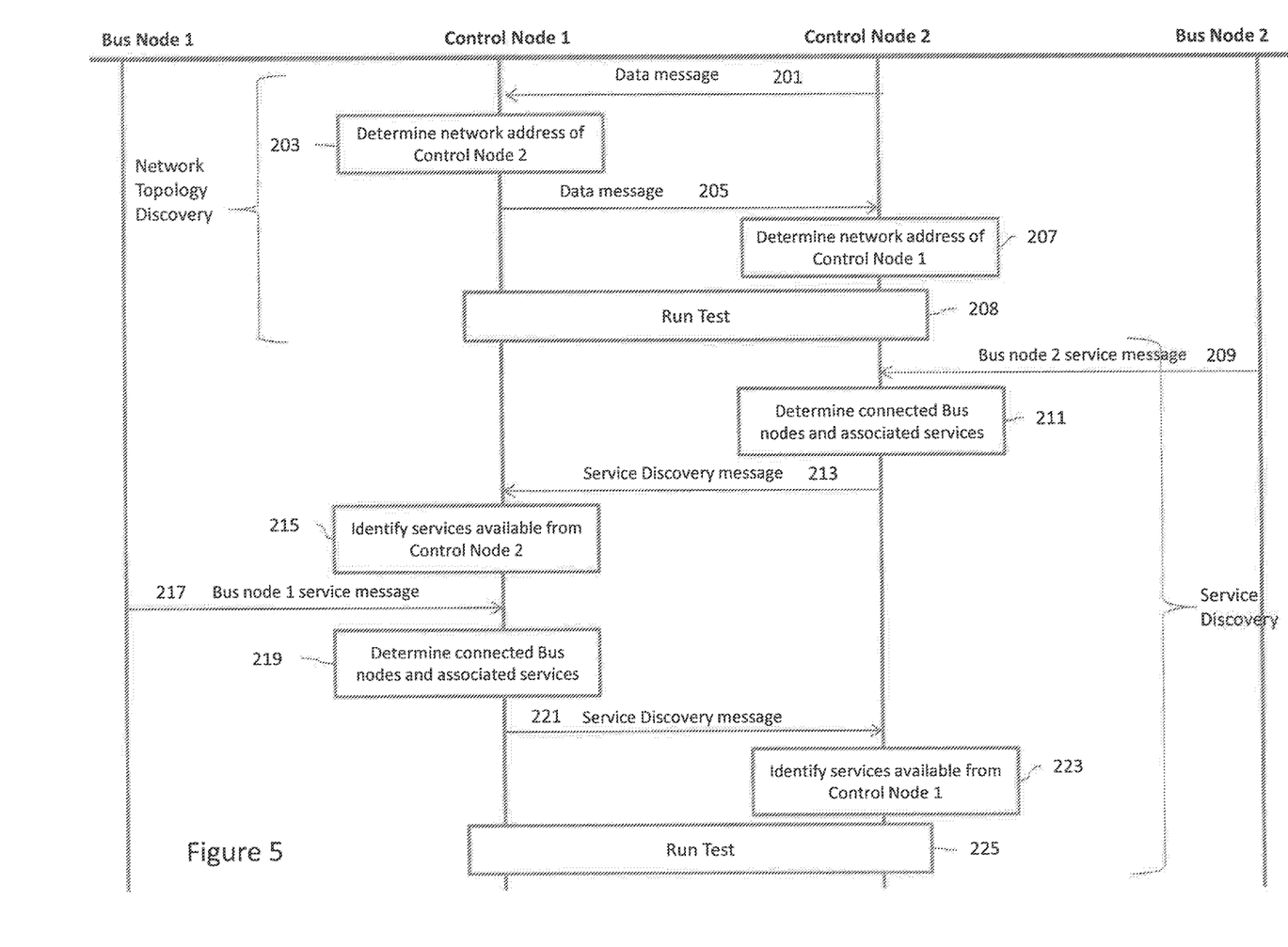
FIG. 5 is a data flow chart illustrating a method of configuring the vehicle data communications network of FIG. 2.

FIG. 5 is a data flow chart illustrating a method of initially configuring the vehicle data communications network 17 of FIG. 2. This initial configuration is referred to herein as 'Learning Mode.' The primary object of Learning Mode is to configure the control nodes with the topology of the vehicle data communications network 17. Again, for illustrative purposes only, the method carried out during Learning Mode will be described with respect to the non-limiting exemplary network of FIG. 2.

Learning Mode may be executed when new hardware components are introduced in the vehicular data communications network 17. One non-limiting example of when this may occur is during vehicle assembly on the production line. The Learning Mode may be executed once the hardware componentry comprised in the automotive vehicle data communications network 17 has been assembled, and any required operating software installed on the control nodes and ECUs comprised within the network. The Learning Mode may be initiated by a remote electronic device 52, such as a configuration terminal operated by an operator on the production line. This may comprise the remote electronic device 52 sending an instruction message to the first and second control nodes 19, 21 to initiate a protocol in accordance with the Learning Mode method of FIG. 5. In accordance with different embodiments, the Learning Mode method may comprise different modules. For example, in certain embodiments Learning Mode may only comprise a Network Topology discovery module, whilst in other embodiments it may also comprise a Service Discovery module. The object of the Network Topology discovery module is to ensure each control node knows the topology of the network in which it is located to ensure that data messages may be exchanged between the different control nodes during subsequent operation of the vehicle 18. The object of the Service Discovery module is to ensure that the different control nodes are aware of the different services available via the vehicular data communications network 17.

The Network Topology Discovery module is initiated at step 201, in which a first data message, which may comprise an address resolution message, is forwarded from the second control node 21 to the first control node 19 via the high-speed communications channel 23. At step 203, the first control node 19 determines the network address associated with the second control node 21 in dependence on the received first data message. For example, in certain embodiments, the first data message may comprise the second control node's network address, enabling the first control nodes to determine the network address simply by reading the content of the received first data message. In certain embodiments the first data message might comprise an Address Resolution Protocol (ARP), and a Gratuitous ARP protocol, which protocols may form the basis for address resolution within the Learning Mode. At step 205, the first control node 19 transmits a second data message, which may comprise an address resolution message, to the second control node 21. Upon receipt of the second data message, at step 207, the second control node 21 determines the network address associated with the first control node 19. At this stage each control node present within the automotive data communications network 17 is aware of the network address associated with the other control nodes located within the network, and the network topology is fully defined. In certain embodiments the Network Topology Discovery module may be complete at this stage. The reader skilled in the art will appreciate that steps 201 through 207 define a network topology discovery protocol. Once each control node is aware of the network addresses of the other control nodes comprised in the vehicular data communications network, data messages may be exchanged therebetween, including data captured by bus node devices, such as sensors, actuators and ECUs operatively coupled to any of the vehicle data busses.

Optionally, on completion of the Network Topology Discovery module a test algorithm may be run, at step 208, to determine if the configuration of the discovered network topology is a valid configuration. To achieve this it is envisaged that the operating software installed on the control nodes may comprise a list of valid network topology configurations. The test algorithm then determines if the detected configuration is consistent with one of the valid configurations. Should an invalid configuration be detected, then an error message may be returned to an operator configuring the vehicular data communications network 17. The error may be indicative that further troubleshooting needs to be carried out to determine the source of the error. This is particularly useful for use on the assembly line. As the different electrical networks are assembled, the network topology discovery module may be run to ensure that the network topologies are valid. For example, as the powertrain network is assembled the test module may run to ensure that the hardware nodes are correctly configured. Similarly, once the chassis and body electronic network is configured the test module may be run to ensure that it is also correctly configured. In this way, correct configuration of each network is ensured before additional componentry is added to the vehicle in the assembly process.

As mentioned previously, the operating software installed on the control nodes comprised in the vehicular data communications network comprises a list of the available and valid network topology configurations. In effect this means that the same operating software may be installed on the control nodes comprised in each vehicle being assembled, irrespective of specific customer selected configuration options. Since each different supported configuration is defined within the operating software, the same operating software may be installed on each control node, and any customised configuration is identified during execution of the Network Topology discovery module. This obviates the need for manual testing of each different custom configuration. The testing algorithm facilitates the identification of any problems in the network during assembly.

In certain embodiments, the Learning Mode may also comprise a Service Discovery module, in which the different services available to each control node are discovered.

During Service Discovery, the second control node 21 receives, at step 209, one or more data service messages from the bus nodes operatively coupled to the second data bus 32, e.g. from the sensors 36, actuators 38 and ECUs 34 operatively connected to the second data bus 32. The data messages may comprise bus node IDs uniquely identifying the bus nodes. At step 211, the second control node 21 identifies the connected bus nodes and the associated services, which again may comprise the use of a lookup table, which correlates bus node IDs with service IDs. In this way the second control node 21 is able to determine each one of the different services available to it via the second data bus 32. At step 213, the second control node 21 generates a service discovery message, which comprises information regarding the different services available to it. For example, the service discovery message may comprise a list of all the different service IDs associated with the services available to the second control node 21. At step 215, the first control node 19 identifies the services available to the second control node 21, from the received service discovery message. In this way, the first control node 19 is informed of the services available to other nodes within the vehicular data communications network 17. The first control node 19 mirrors the steps carried out by the second control node 21, to first determine the services available to it, and subsequently informing other control nodes within the vehicular data communications network 17 of the available services. For example, at step 217, the first control node 19 receives one or more data service messages from the bus nodes operatively coupled to the first data bus 24, e.g. from the sensors 28, actuators 30 and ECUs 26 operatively connected to the first data bus 24. At step 219, the first control node 19 determines each one of the different services available to it via the first data bus 24. This may comprise the use of a lookup table which correlates bus node IDs with service IDs, as mentioned previously. At step 221, the first control node 19 generates and transmits to the second control node 21 a service discovery message, comprising information regarding the different services available to it. Upon receipt, at step 223, the second control node 21 identifies the services available to the first control node 19, from the received service discovery message. In this way, the second control node 21 is informed of the services available to other nodes within the vehicular data communications network 17. Optionally, the service discovery module may also comprise, at step 225, running a test algorithm to determine whether the configuration of identified services are valid. This step is similar to step 208, and serves to provide an assembly operator with information regarding any errors within the vehicular data communications network as it is being assembled.

At successful completion of the Service Discovery component of the Learning Mode, each control node within the vehicular data communication network 17 is aware of the services available to it via any of the other control nodes within the network. This is particularly useful for integration with an external electronic device 52, since the electronic device may be provided with information regarding the different services available within the vehicular data communications channel 17. The electronic device 52, which in certain embodiments may relate to a mobile smartphone, may then issue a request for specific services to the communication node 50, which may then be forwarded by the communication node 50 to the relevant control node, in order to establish a subscription for the desired service.

In certain embodiments, the Learning Mode, may be carried out whilst the vehicle 18 is being assembled on the assembly line, whenever a new hardware component is introduced. Optionally, the test algorithm may also be run as new hardware componentry is introduced in the assembly line in a recursive manner. Similarly, the Learning Mode may be run when new hardware componentry is introduced within the vehicle, including any after sales modifications. For example, during any after sales upgrade of the vehicle hardware. Similarly, the Learning Mode may also be carried out when new software or software updates are installed on vehicular data network including after sales upgrades of the software.

In certain embodiments upon completion of the service discovery module, the service and network configuration of the controllers within the automotive data communications network are frozen to enable the test algorithm to be carried out in order to detect any configuration errors. Once the test algorithm has completed and valid configuration identified, the network is ready for use.

A further advantage associated with the Learning Mode of configuring the vehicular data communications network 17, is that it caters for a large number of vehicle variants. The different functionality afforded by each vehicular data communications network will be dependent on the specific hardware componentry present within each vehicular data communications network, and/or the software installed on the available hardware. The method associated with the Learning Mode significantly facilitates the role of the vehicle configuration operator, whose role is now effectively restricted to simply ensuring that the operating software is installed on the control nodes such that an algorithm in accordance with the Learning Mode method may be executed, and running the optional one or more test algorithms for troubleshooting purposes. The test algorithm may function substantially as described previously in relation to step 208. The Learning Mode is complete once the optional test algorithm within the Service Discovery module has been completed.

Yet a further advantage associated with the Learning Mode method of configuring the vehicular data communications network is that there is no need for any form of manual intervention by the operator during vehicle assembly, to cater for any customer selected custom network configurations—customised configurations are catered for automatically in dependence on the available hardware and the predefined valid configurations comprised in the control nodes' operative software. In this regard the automotive vehicle network may be considered to be a dynamic network.

In certain embodiments, the Learning Mode may comprise a Rapid Spanning Tree Protocol, and/or a Stream Reservation Protocol.

In contrast with the static configurations of the vehicular data communications networks of the prior art, the vehicular data communications networks in accordance with embodiments of the present invention provide a flexible, dynamic architecture readily enabling network expansion, including both hardware and software expansion. The vehicular data communications network according to embodiments of the present invention are therefore able to readily support after sales expansion of network functionality, and also improved integration with external devices, such as mobile smartphones. The vehicular data communications networks in accordance with embodiments of the present invention are therefore better placed to meet potential future requirements when compared to the systems of the existing state of the art.

In certain embodiments the method of FIG. 4 may be simplified. For example, steps 101 and 113 may be consolidated into a single step. In such embodiments the first control node 19 receives a first bus node data message comprising the bus node ID and any data captured and/or generated by the bus node. The first control node performs the lookup action of step 103 and associated the one or more relevant service IDs to the received first bus node data messages and generates a second message comprising the relevant service IDs and the first bus node data messages. This generated message is subsequently transmitted via the high-speed communication channel 23. Upon receipt of the message, the second control node 21 may determine from the one or more service IDs comprised in the received data message whether to keep the message. Assuming that the services are of interest to the second control node 21, the data is maintained and routed to the applicable bus nodes operatively connected to the second data bus 32. In such embodiments, steps 109 through 117, specifically the generation of the subscription request message by the second control node 21, the generation of the subscription event by the first control node 19, and the forwarding of bus data to the second control node in dependence on a subscription event may be optional. Instead, the first control node makes each data message received from the first data bus 24 available via the high-speed communications network 23. The second control node 21 may avail itself of this data when needed.

Whilst the herein described embodiments have been described with reference to a first control node 19 acting as a transmitting or broadcasting node, and the second control node 21 acting as a receiving or subscribing node, it is to be appreciated that each control node within the vehicular data communications network 17 enables both functionality. Thus, the first control node 19 is able to also act as a subscribing node to subscribe to services broadcast by the second control node 21, and it follows that the second control node 21 is able to act as a transmitting or broadcasting node.

Within the context of the present disclosure, it is to be appreciated that the term services used throughout the preceding description of embodiments, may relate to hardware functionality as well as to software functionality. Thus, service IDs may also uniquely identify different software or application components.

Many modifications may be made to the above examples without departing from the scope of the present invention as defined in the accompanying claims.

The invention claimed is:

1. A controller for an automotive data communications network in a vehicle, the controller comprising:
a first input configured to receive a first data message from a data bus of the automotive data communications network in the vehicle, the first data message comprising data associated with at least one first electronic device connected to the data bus;
a processor configured to identify at least one service associated with the received first data message;
an output configured to output a second data message on a high-speed data communications channel operatively connected to the controller, the second data message offering the at least one service as a subscription service; and
a second input configured to receive a subscription request for the service from a remotely located second electronic device that is located external to the automotive data communications network; wherein
the output is configured to output a third data message comprising data associated with the service to the remotely located second electronic device via the high-speed data communications channel.

2. The controller of claim 1, wherein
the processor is configured to identify at least one service ID from a lookup table in a memory, the at least one service ID being associated with the received first data message and uniquely identifying the at least one service associated with the received first data message;
the output is configured to output the second data message comprising the at least one service ID;
the second input is configured to receive the subscription request designating the at least one service ID from the remotely located second electronic device; and
the output is arranged to output the third data message associated with the designated service ID to the remotely located second electronic device via the high-speed data communications channel.

3. The controller of claim 1, wherein
the received subscription request comprises a network address associated with the remotely located second electronic device; and
the output is configured to output the third data message to the remotely located second electronic device in dependence on the network address.

4. The controller of claim 1, wherein
the first electronic device is a sensor configured to capture data associated with a physical variable;
the first input is configured to receive the first data message comprising data associated with the physical variable captured by the sensor;
the processor is configured to identify at least one service associated with the captured data; and
the output is configured to output the third data message comprising the captured data associated with the physical variable to the remotely located second electronic device.

5. The controller of claim 1, wherein
the second electronic device is a second controller operatively connected to a second data bus and the high-speed data communications channel; and
the output is configured to output the third data message to the second controller.

6. A controller for an automotive data communications network in a vehicle, the controller being operatively connected to a data bus and a high-speed data communications channel, the data bus being connected to at least one first electronic device, the controller comprising:
a first input configured to receive a first data message via the high-speed data communications channel from a remotely located second electronic device that is located external to the automotive data network, the first data message offering a service as a subscription service;
an output configured to output a second data message comprising a subscription request for the service to the remotely located second electronic device; and
a second input configured to receive a third data message from the remotely located second electronic device comprising data associated with the subscribed service.

7. The controller of claim 6, comprising
a processor configured to determine if the service is of interest, in dependence on a service ID associated with the first data message; and
wherein the subscription request comprises a service ID associated with the subscription service.

8. The controller of claim 7, comprising a memory including a look up table, and wherein the processor is configured to identify the service associated with the service ID from the lookup table.

9. The controller of claim 6, the subscription request comprises a service ID uniquely identifying the requested service.

10. The controller of claim 6, wherein
the received first data message comprises a network address associated with the remotely located second electronic device; and
the output is configured to output the second data message to the remotely located second electronic device in dependence on the network address.

11. The controller of claim 6, wherein the output is configured to output a control signal via the data bus in dependence on the received third data message, the control signal enabling operation of the at least one first electronic device.

12. A method of providing data associated with a first electronic device operatively connected to a data bus as a subscription service in an automotive data communications network, the network comprising a controller operatively coupled to the data bus and to a high-speed data communications channel, the method comprising:
receiving a first data message over the data bus of the automotive data communications network, the first data message comprising data generated by the first electronic device;

identifying at least one service associated with the received first data message;

outputting a second data message on the high-speed data communications channel, the second data message offering the at least one service as a subscription service;

receiving a subscription request for the service from a remotely located second electronic device that is located external to the automotive data communications network; and outputting a third data message comprising data associated with the service to the remotely located second electronic device via the high-speed data communications channel.

13. The method of claim 12, comprising:

identifying at least one service ID from a lookup table, the at least one service ID being associated with the received first data message and uniquely identifying the at least one service associated with the received first data message;

including the at least one service ID in the second data message;

receiving the subscription request designating the at least one service ID from the remotely located second electronic device; and outputting the third data message comprising data associated with the designated service ID to the remotely located second electronic device.

14. The method of claim 12, wherein the received subscription request comprises a network address associated with the remotely located second electronic device, and the method comprises:

outputting the third data message to the remotely located second electronic device in dependence on the network address.

15. The method of claim 12, wherein the first electronic device is a sensor configured to capture data associated with a physical variable;

the first data message comprises data associated with the physical variable captured by the sensor;

the at least one service is associated with the captured data; and the third data message comprises the captured data associated with the physical variable.

16. The method of claim 12, wherein the second electronic device comprises an actuator.

17. The method of claim 12, wherein the second electronic device comprises a second controller operatively connected to the high-speed data communications channel.

18. A vehicle comprising the controller of claim 1.

19. A non-transitory computer-readable data carrier including instructions for carrying out the method of claim 12.

20. The controller of claim 1, wherein the data communications network comprises a communications node operatively coupled to the high-speed communications channel, and wherein the communications node is configured to provide a communications interface with the remotely located second electronic device.

* * * * *